United States Patent [19]

Natalizia

[11] 4,126,295

[45] Nov. 21, 1978

[54] BALL VALVE HAVING METAL SEAT RINGS

[75] Inventor: Angelo Natalizia, Cranston, R.I.

[73] Assignee: International Telephone and Telegraph Corporation, Nutley, N.J.

[21] Appl. No.: 725,205

[22] Filed: Sep. 22, 1976

[51] Int. Cl.² .................................................. F16K 5/06
[52] U.S. Cl. .................................... 251/315; 251/174; 251/192; 251/368
[58] Field of Search ............... 251/159, 160, 162, 315, 251/368, 174, 192, 317

[56] References Cited

U.S. PATENT DOCUMENTS

| | | | |
|---|---|---|---|
| 2,373,628 | 4/1945 | Gleeson | 251/315 |
| 2,573,177 | 10/1951 | Bohlen | 251/315 X |
| 3,045,693 | 7/1962 | Allen | 251/315 X |
| 3,372,901 | 3/1968 | Manor et al. | 251/315 |
| 3,394,915 | 7/1968 | Gachot | 251/315 X |
| 3,827,671 | 8/1974 | Bolden | 251/215 X |

Primary Examiner—Arnold Rosenthal
Attorney, Agent, or Firm—John T. O'Halloran; Peter C. Van Der Sluys

[57] ABSTRACT

This relates to a ball valve of the top entry non-spherical type. A soft metal coating is deposited on that portion of the seat ring which contacts the valve member or ball. The ball and seat assembly is inserted into a valve chamber such that the seat rings are in an unstressed condition. After insertion, the ball is rotated 90° causing the ball to engage the soft metal coating, thereby crushing the soft metal to form a tight seal with the ball. In this manner, the lapping process, generally required when metal seats are employed, is eliminated. Further, the seats may be replaced without replacing the ball.

19 Claims, 8 Drawing Figures

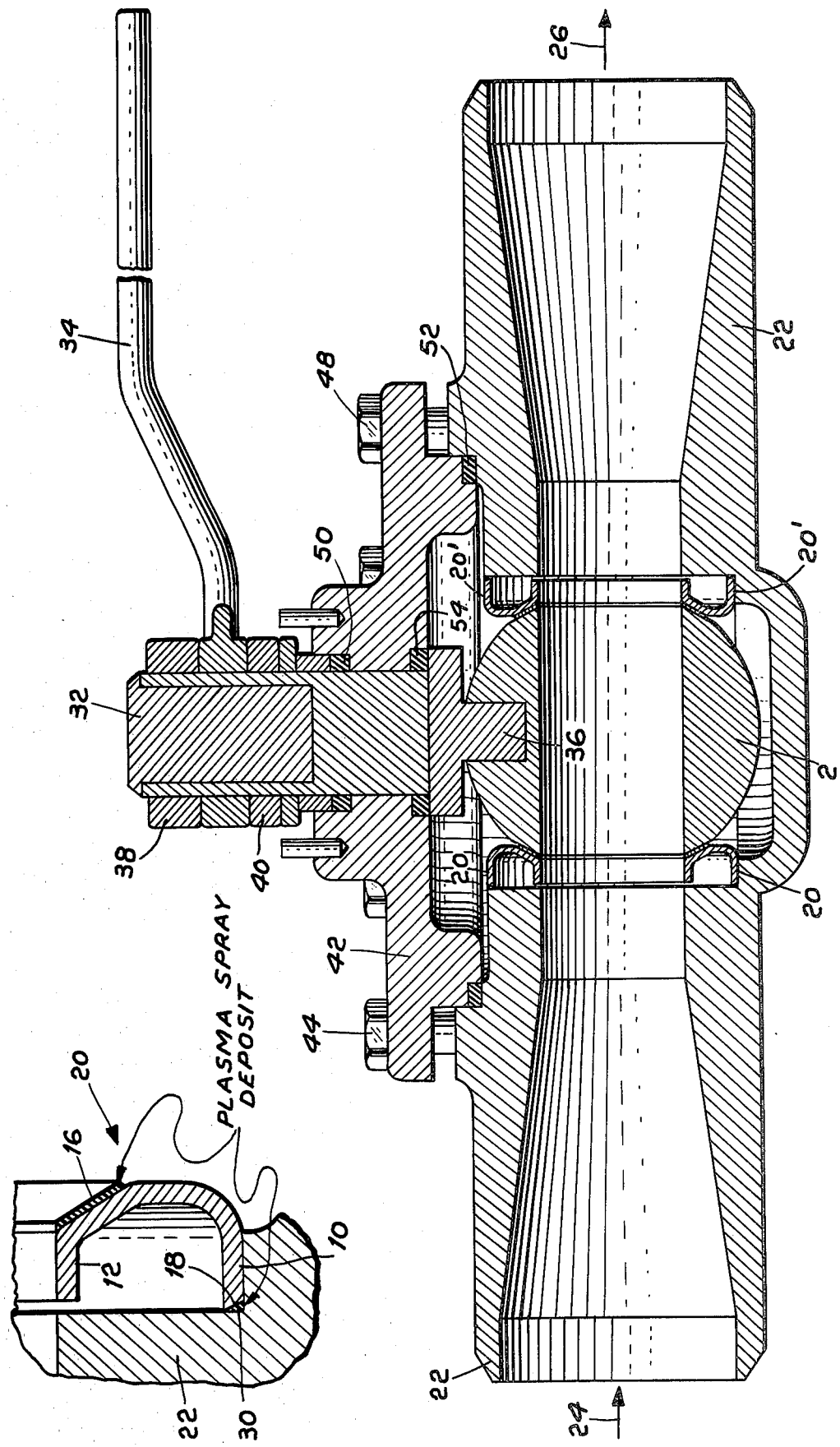

BALL VALVE HAVING METAL SEAT RINGS

BACKGROUND OF THE INVENTION

This invention relates generally to ball valves and, more particularly, to top entry ball valves employing metal seat rings having a soft metal coating thereon.

Ball valves are well known and generally consist of a valve body having a valve chamber, a substantially spherical valve member or ball positioned in the valve chamber, and one or two seat members positioned between the valve member and the ends of the valve chamber. The valve member has an internal passage therethrough which forms a flow path from valve inlet to valve outlet when the valve is in the open position. Means are provided for rotating the ball from an open to closed position and vice versa.

Several techniques have been employed to accommodate rigid seating members while taking full advantage of top entry construction. For example, the valve chamber may be tapered inwardly from the top resulting in an upper opening sufficiently large for insertion and retraction of the ball and seat assembly. Clearly, precautions must be taken when using this type of arrangement to ensure proper sealing between the ball, seat and valve body. For example, springs must be employed to urge the seats downward into position.

Another known solution employs a ball having an axial length substantially less than its diameter. In this way, when the ball is in the open position, it may freely enter the valve housing from a top opening.

A leakage specification of 10 milliliters of hydrostatic medium has developed for metal seated gate and globe valves which enjoy a large mechanical advantage in the creation of pressures on the valve closure member and seats. In contrast, metal seated ball valves, like check valves, have virtually only the line pressure available to create sealing. Metal seated ball and check valves have been unable to meet the above referred to leakage specifications. In order to achieve even a reasonably tight seal, it has in the past been necessary to lap the balls and seat members to masters and then to each other. This creates, in effect, seat members which are matched to a particular ball and thus the seat members cannot be replaced without replacing the ball. Since the lapping process is both time-consuming and expensive, an alternative approach has been sought.

For example, seat rings for ball valves may be formed, in whole or in part, from various flexible materials, e.g., rubber, Teflon, etc. This is especially suitable for top entry ball valves since the flexible seats are easily deformable, thus permitting easy compression of the seats and valve member and insertion, as a unit, into the valve chamber. However, the use of flexible seat rings has presented certain problems. Most seals are of the compression type, i.e., each seat is compressed between the valve member and an end wall of the valve body causing the spherical surface of the ball to maintain intimate contact with the seat, thereby establishing a seal between the valve body and the seat member and between the valve member or ball and the seat member. Obviously, after a period of time, the flexible materials would sufficiently wear, resulting in a decrease of the initial built-in compression reducing the integrity of the seal. Further, such materials are not suitable for high-temperature service in the order of 1,000° F or cryogenic service where temperatures in the order of −400° F must be accommodated. At the higher temperatures, the material simply melts, while at the lower temperature the material cracks. For this reason, metal seat rings must be employed at extreme temperatures; however, their greater rigidity makes top entry a problem. Further, metal seated ball and check valves have been unable to meet the above referred to leakage specifications. In fact, the severity of the above mentioned problems has caused certain manufacturers to request that the leakage allowances of metal seated ball valves be made less stringent.

SUMMARY OF THE INVENTION

It is an object of the present invention to provide a metal seat ring for use in a ball valve which will meet current leakage specifications.

It is a further object of the present invention to provide a metal seat ring for use in a ball valve which provides a tight seal without lapping. In accordance with the invention, the seat/ball assembly would not be a matched set, and it would be possible to replace just the seat or seats if they should become damaged or worn.

It is a further object of the present invention that the inventive seat ring be operational at extreme temperatures without deterioration of the seat material.

Finally, it is an object of the present invention to provide a metal seat ring for use in a top entry ball valve. The invention anticipates the use of a non-spherical ball having relieved portions which cooperate with the seats in the open position. This permits easy insertion of the ball/seat assembly into the valve chamber from above.

According to a broad aspect of the invention, there is provided a metallic valve seat, for use in a valve house defining a chamber and inlet and outlet ports, said chamber having a closure member therein, comprising: a first metal portion for engaging said housing around one of said inlet and outlet openings; and a soft metal layer deposited on a region of said first portion for engaging said closure member.

The above and other objects of the present invention will be more clearly understood from the following detailed description taken in conjunction with the accompanying drawings in which:

BRIEF DESCRIPTION OF THE DRAWINGS

FIG. 6 is a cross-sectional view of an alternate form of ball/seat assembly; and FIG. 7 is a cross-sectional view of an assembled ball valve according to the invention.

DESCRIPTION OF THE PREFERRED EMBODIMENT

Figure 1:
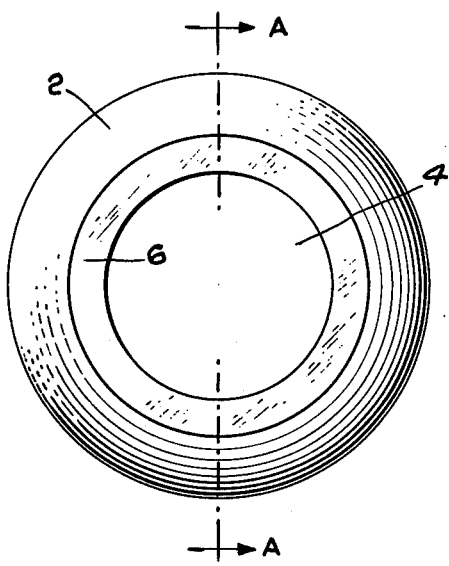
FIG. 1 is a view of a ball for use in a ball valve according to the invention taken along a longitudinal axis of the flow path of the ball.
Figure 2:
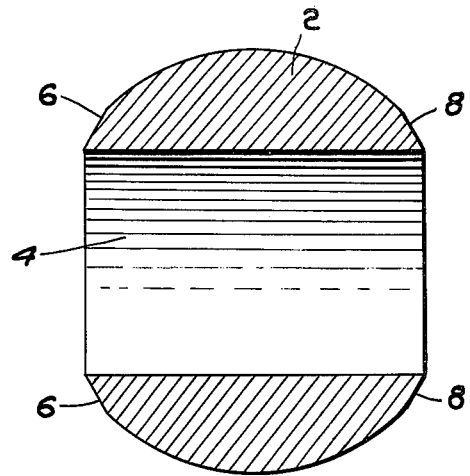
FIG. 2 is a cross-sectional view of the ball of FIG. 1 taken along line A—A.

FIGS. 1 and 2 illustrate a valve member 2 having a bore 4 therethrough for communicating with the inlet and outlet ports of a valve. As can be seen, the valve member has a circular cross-section in a plane perpendicular to the longitudinal axis of the bore 4. However, the section of FIG. 2, taken along a plane parallel to said axis, is not circular. The regions surrounding the periphery of the bore on both the inlet and outlet sides of the valve member are relieved to provide surfaces 6 and 8 respectively on each side of the ball. The use of this type of non-symmetrical ball in a top entry valve is more fully discussed and described in copending U.S. application Ser. No. 593,098 filed July 3, 1975.

Figure 3A:
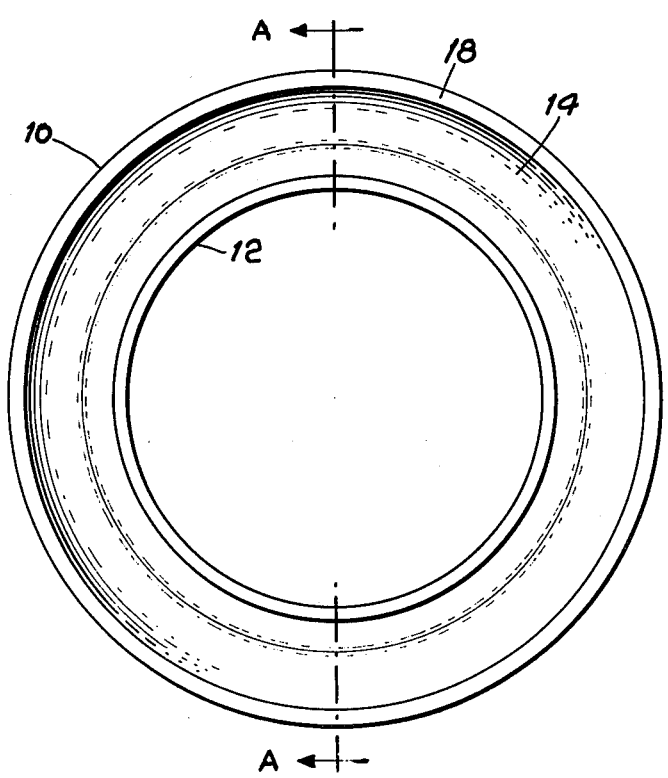
FIG. 3a is a view of a valve seat.
Figure 3B:
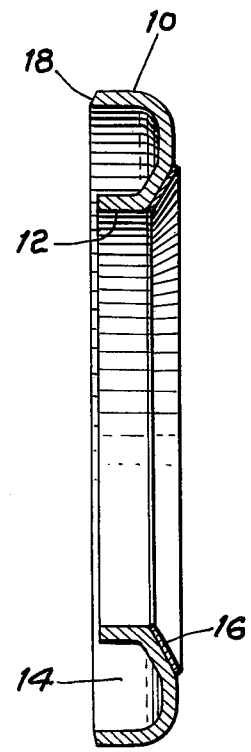
FIG. 3b is a cross-sectional view of the inventive valve seat.

FIGS. 3a and 3b illustrate generally the inventive valve seat, FIG. 3b being a cross-section of FIG. 3a taken along line A—A. The seat ring consists of a generally U-shaped cylindrical structure which may be stamped from a metal sheet having resilient characteristics, e.g. Inconel 718, stainless steel, etc. The legs 10 and 12 of well 14 support the seat against the valve body in a manner to be discussed in detail below. A portion of the seat ring has disposed thereon a soft metal layer 16. Metals such as silver, gold, cadmium, nickel, copper and certain alloys thereof would be suitable for this purpose and may be formed by plating, plasma spraying or other well known techniques. Leg member 10 has a beveled surface 18 for reasons which will be more fully discussed below.

Figure 4:
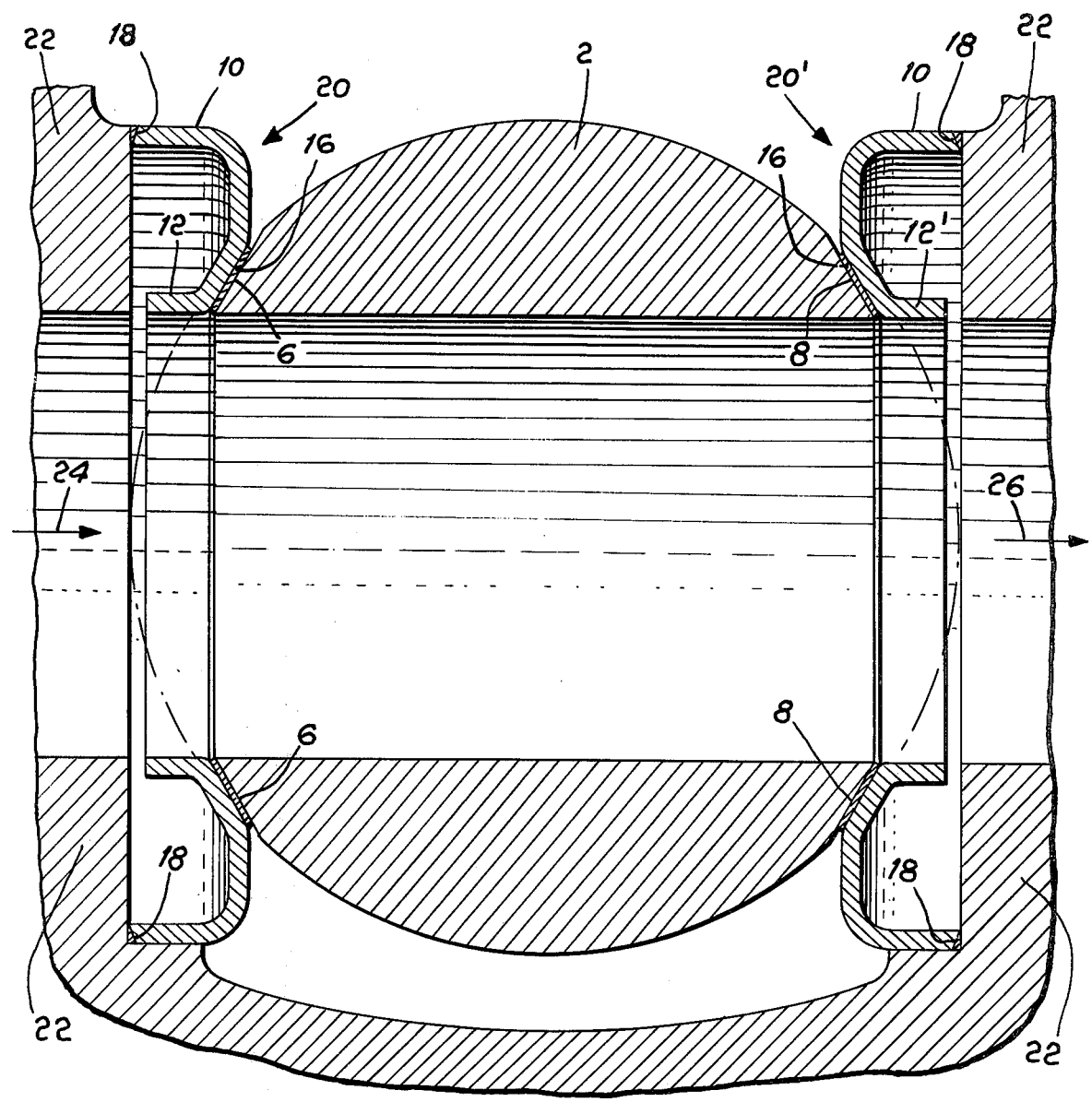
FIG. 4 is a cross-sectional view of the inventive seat in engagement with the ball of a ball valve in the open position.

FIG. 4 illustrates the use of the inventive type seat rings in a ball valve assembly. The assembly consists of ball 2, seats 20 and 20', valve body 22, inlet port 24 and outlet port 26. The valve assembly is shown in the open position. In the open position, relieved surfaces 6 and 8 of the ball 2 merely engage the regions of soft metal on the valve seats 16 and 16', i.e., the relieved surfaces on the ball cooperate with the seats such that the seat material is not compressed. The seat/ball assembly is so dimensioned in the open position to allow easy insertion into the valve chamber from above. In the closed position, the seats are stressed by the spherical surface of the ball, i.e., the spherical surfaces interfere with the relaxed position of the seats. The amount of compression is determined by the interference fit of the spherical surfaces. The ball and valve seats are so assembled prior to entry into the valve chamber. In this manner, the entire assembly may be easily inserted.

It will be noted from FIG. 4 that the beveled edges of the valve seats 18 and 18' engage the valve body 22. The beveled edges provide a line contact which results in a greater seating force per unit area, thereby increasing the effectiveness of the seal. As an alternative to the use of beveled edges 18 and 18', an additional soft metal coating may be employed as is shown at 30 in FIG. 6. This additional coating may likewise be formed by plating or plasma spraying.

The dotted line through regions 16 and 16' indicate the interference fit of the spherical portion of ball 2. Gaps 28 and 28', having a width that is equal to or slightly greater than one-half the interference fit of the ball are provided. In this manner, when the ball is rotated to the closed position, legs 12 and 12' will abut or nearly abut valve body 22 so that in the event of a subsequent pressure surge, legs 10 and 12 will provide sufficient support to prevent collapse of the seat ring.

Figure 5:
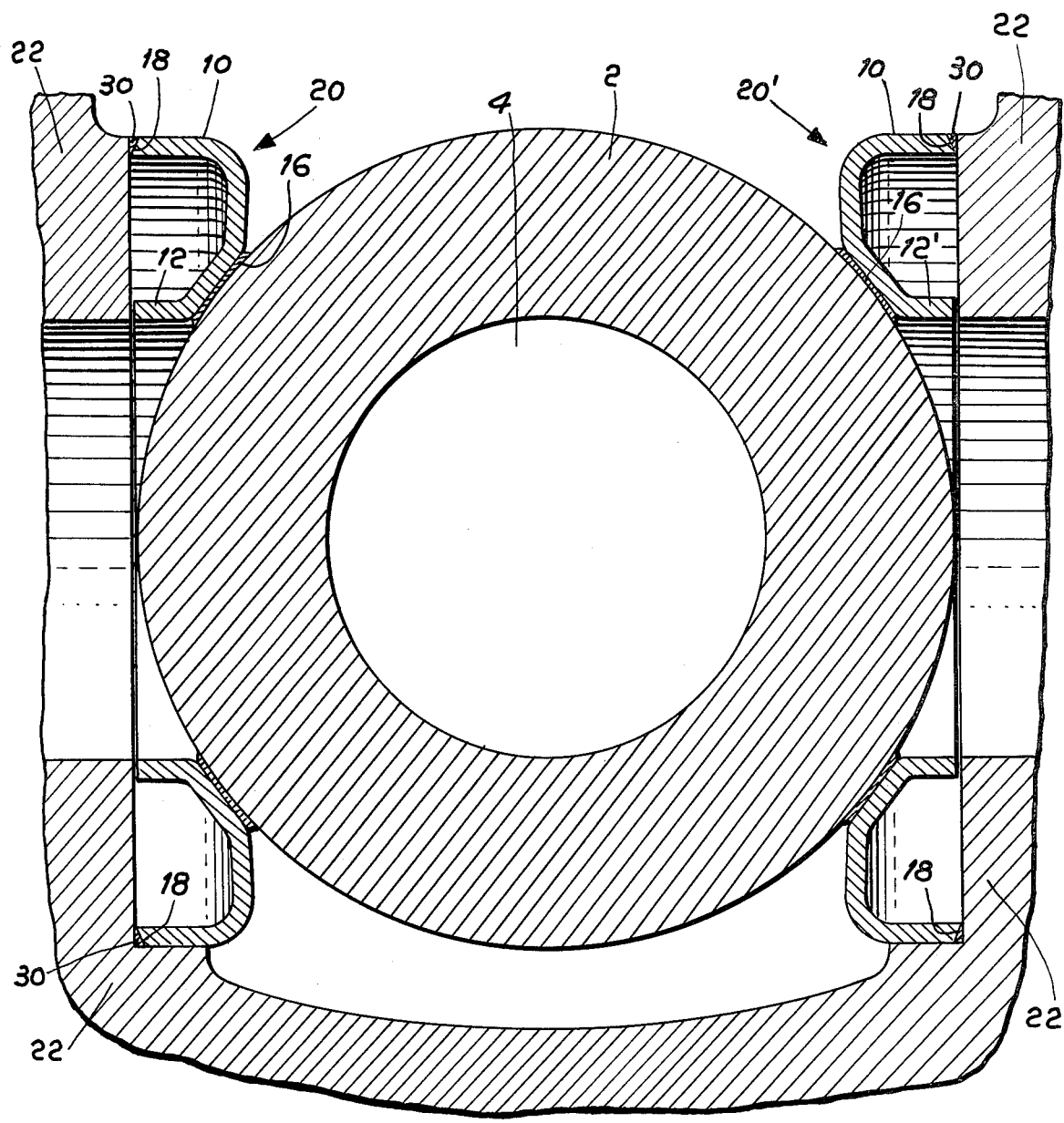
FIG. 5 is a cross-sectional view of the inventive seat in engagement with the ball of a ball valve in the closed position.

After insertion of the ball and seat assembly into the valve chamber as shown in FIG. 4, the ball is rotated 90° causing the soft metal layer to be crushed, thereby providing a surface contour that conforms to the surface of the ball. This crushed surface than provides an excellent seal between the valve seat and the ball. Obviously, the ball material must be harder than the soft metal layer in order to accomplish the required crushing. Further, the metal should be soft enough so as not to damage the ball after repeated rotations. It is to be noted that the soft metal is crushed or compressed when the ball is rotated and not sheared away as shearing would result in the ball contacting the hard metal seat. As above described, gaps 28 and 28' absorb the interference fit of the ball when the valve is in the closed position as shown in FIG. 5.

FIG. 7 illustrates a complete top entry ball valve assembly. Ball 2 communicates with inlet and outlet ports 24 and 26 of valve body 22 via seats 20 and 20' respectively. Valve stem 32, having a handle 34 coupled thereto, communicates with ball 2 via extension 36. Handle 34 is secured to stem 32 by any suitable means, for example, a nut 38 and stop nut 40. A cover 42 is secured by cap screws 44 and 48. Sealing is provided by stem seal 50, gasket 52 and thrust washer 54. When necessary, the ball and seat assembly may be replaced by merely removing cover 42 and extracting the ball and seat assembly.

In summary, the inventive non-spherical ball and seat assembly provide a wedging action and mechanical advantage normally provided by separate actuators in other types of valves. This eliminates the need for time-consuming and costly lapping required by the prior art. Further, replacement of the valve seats is possible without the need for providing a new ball since the ball and valve seats are no longer matched sets as is the case when the ball and seats are lapped together. Most importantly, the inventive arrangement provides a sealing surface which meets current leakage specifications.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. A ball and seat assembly for insertion into a top entry valve housing defining inlet and outlet ports and seat engaging surfaces surrounding said ports, and for providing communication with said inlet and outlet ports, comprising:
    a ball member having a spherical surface and an internal bore therethrough forming inlet and outlet openings, the periphery of each of said openings being surrounded by a relieved surface portion; and
    a first seat having a soft metal coating thereon, said first seat coupled between one of said inlet and outlet ports and said ball member such that said soft metal coating engages the relieved surface portion surrounding one of said openings.

2. A ball and seat assembly according to claim 1 further including a second seat having a soft metal coating thereon, said second seat coupled between the other of said outlet ports and said ball member such that said soft metal coating engages the relieved surface portion surrounding the other of said openings and the seats also engage the seat engaging surfaces of the housing with the seats in a non-compressed state.

3. A ball and seat assembly according to claim 1 wherein said seat is stamped from a metal sheet, said metal sheet having resilient characteristics.

4. A ball and seat assembly according to claim 3 wherein said metal is stainless steel.

5. A ball and seat assembly according to claim 3 wherein said metal sheet is Inconel 718.

6. A ball and seat assembly according to claim 1 wherein said soft metal is selected from the group consisting of silver, gold, cadmium, nickel and copper.

7. A ball and seat assembly according to claim 1 wherein said seat has a beveled edge portion which engages one of the seat engaging surfaces of the housing to provide a high-pressure linear seal.

8. A ball and seat assembly according to claim 1 wherein a soft metal region on said seat engages one of the seat engaging surfaces of the housing to provide an effective seal.

9. A top entry ball valve, comprising:
a body having a chamber including two parallel surface portions and inlet and outlet ports formed in said parallel surface portions;
a ball member having a spherical surface and an internal bore therethrough forming inlet and outlet openings, the surface of the ball around the periphery of said openings being relieved, said ball member located within said chamber;
a first seat having a soft metal layer on a portion thereof, said first seat coupled between one of said parallel surface portions and said ball member such that said soft metal layer engages a relieved surface of the ball with the seat in a non-compressed state; and
means for rotating said ball member to a position where the soft metal layer engages the spherical surfaces, thereby crushing said soft metal layer to provide a tight seal.

10. A top entry ball valve as described in claim 9, further including a second valve seat having a soft metal layer on a portion thereof coupled between the other of said parallel surface portions and said ball member such that said soft metal layer engages the relieved surface of the ball with the seat in a non-compressed state, said ball and seats being slidable between the parallel surface portions.

11. A top entry ball valve according to claim 10 wherein said first and second seats are stamped from a sheet of a first metal, said first metal having resilient characteristics and wherein said soft metal layer is deposited on a portion of said seats.

12. A top entry ball valve according to claim 11 wherein said first metal is stainless steel.

13. A top entry ball valve according to claim 11 wherein said first metal is Iconel 718.

14. A top entry ball valve according to claim 11 wherein said soft metal is selected from the group consisting of silver, gold, cadmium, nickel and copper.

15. A top entry ball valve according to claim 11 wherein said first and second seats have a beveled edge portion which engages said parallel surface portions to provide a high-pressure linear seal.

16. A top entry ball valve according to claim 11 wherein a second soft metal region on said first and second seats engages said parallel surface portions to provide an effective seal.

17. A top entry ball valve according to claim 11 wherein each of said first and second seats have a substantially U-shaped structure with first and second leg members and a base member, said first member longer than said second member by a predetermined amount such that when said seats are unstressed, only the first member of each seat abuts said parallel surface portions, and when said seats are stressed, said second leg substantially abuts said surface portions.

18. A ball and seat assembly for use in a top entry ball valve of the type that includes a housing having inlet and outlet ports and seat engaging surfaces surrounding said ports, said ball and seat assembly, comprising:
a ball member having an internal bore therethrough forming inlet and outlet openings, said ball member having an outer spherical surface region merging into contiguous relieved outer surface regions, said relieved outer surface regions surrounding the peripheries of said inlet and outlet openings;
a first resilient metal valve seat having a ball engaging surface formed of a layer of soft metal and a housing engaging surface, said seat adapted to be disposed between the seat engaging surface surrounding the inlet port and said ball member; and
a second resilient metal valve seat having a ball engaging surface formed of a layer of soft metal and a housing engaging surface, said seat adapted to be disposed between the seat engaging surface surrounding the outlet port and said ball, the ball member and valve seats being of a size so that when the ball member and valve seats are assembled with the ball engaging surfaces of the valve seats engaging the relieved outer surface regions of the ball member, the assembly may be slidably received between the seat engaging surfaces of the housing, whereby the valve seats hold the ball member in place within the housing by merely engaging the seat engaging surfaces of the housing and said relieved outer surface regions of the ball when the ball member is disposed in an open position with the bore in communication with the housing ports and the outer spherical surface region of the ball member crushes the soft metal layer, thereby sealingly engaging the valve seats when the ball member is disposed in a closed position with the outer spherical surface of the ball member engaging the ball engaging surfaces of the seats.

19. A top entry ball valve, comprising:
a housing having a top opening extending to a chamber, inlet and outlet ports communicating with said chamber and seat engaging surfaces surrounding said ports and partially defining said chamber;
a ball member having an internal bore therethrough forming inlet and outlet openings, said ball member having an outer spherical surface region merging into contiguous relieved outer surface regions, said relieved outer surface regions surrounding the peripheries of said inlet and outlet openings, said ball member being located within the chamber of the housing;
first and second resilient metal valve seats, each having a ball engaging surface formed of a layer of soft metal and a housing engaging surface, said first valve seat being disposed between the seat engaging surface surrounding the inlet port and said ball member, and said second valve seat being disposed between the seat engaging surface surrounding the outlet port and said ball member, the ball member and valve seats being of a size so that when the ball member is in an open position with the ball engaging surfaces of the valve seats engaging the relieved outer surface regions of the ball member, the valve seats and ball member may be slidingly received into the chamber without significant compression of the valve seats which hold the ball member in place within the chamber by merely engaging the seat engaging surfaces of the housing and said relieved outer surface regions of the ball and when the ball member is disposed in a closed position, the outer spherical surface region of the ball member engages the ball engaging surfaces of the valve seats to crush the soft metal layer and sealingly engage the valve seats to close the ball valve;

means for closing the chamber at the top of the valve; and means for rotating the ball between opened and closed positions.

* * * * *